(12) United States Patent
  Bolognia

(10) Patent No.: US 11,668,864 B2
(45) Date of Patent: Jun. 6, 2023

(54) THIN OPTICAL FILTER ARRAYS

(71) Applicant: ANALOG DEVICES, INC., Norwood, MA (US)

(72) Inventor: David Frank Bolognia, North Andover, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 726 days.

(21) Appl. No.: 15/625,955

(22) Filed: Jun. 16, 2017

(65) Prior Publication Data

US 2018/0180782 A1   Jun. 28, 2018

Related U.S. Application Data

(60) Provisional application No. 62/438,363, filed on Dec. 22, 2016.

(51) Int. Cl.
  *G02B 5/20*   (2006.01)
  *G02B 7/00*   (2021.01)
  (Continued)

(52) U.S. Cl.
  CPC ............ *G02B 5/201* (2013.01); *G01J 3/0202* (2013.01); *G01J 3/0256* (2013.01); *G01J 3/36* (2013.01);
  (Continued)

(58) Field of Classification Search
  CPC ...... G02B 5/02; G02B 5/0273; G02B 5/0278; G02B 5/20; G02B 5/201; G02B 5/204; G02B 5/208; G02B 5/22; G02B 5/226; G02B 5/28; G02B 5/281; G02B 5/283; G02B 5/285–288; G02B 6/42; G02B 6/4201; G02B 6/4256; G02B 6/4257; G02B 6/4259; G02B 7/00; G02B 7/006; G02B 27/0018; G02B 27/1006; G02B 27/1013; G02B 27/102; G01J 3/00; G01J 3/0202; G01J 3/0208; G01J 3/28; G01J 3/2803; G01J 3/2823; G01J 2003/2803; G01J 2003/2806; G01J 2003/2809;
  (Continued)

(56) References Cited

U.S. PATENT DOCUMENTS 4,741,963 A * 5/1988 Wada ............... G02B 5/226
                                                    428/428
4,948,706 A * 8/1990 Sugihara ............ G03F 1/56
                                                    216/101
(Continued)

FOREIGN PATENT DOCUMENTS

WO   WO-2012157726 A1 * 11/2012  ......... B29C 33/3857
WO   WO 2016/003276           1/2016
WO   WO-2016099531 A1 * 6/2016  ........... G02B 6/4206

*Primary Examiner* — Nicholas R. Pasko
(74) *Attorney, Agent, or Firm* — Knobbe, Martens, Olson & Bear LLP

(57) ABSTRACT

An array of optical filters having a front side and a back side is disclosed. The array of optical filters includes first and second optical filters and a molding compound. The first and second optical filters each include a substrate having a back surface coplanar with the back side of the molding compound, and a filter layer having a front surface coplanar with the front side of the molding compound. The molding compound covers the sidewalls of the filter substrates and filter layers, and fills gaps between the filters.

20 Claims, 6 Drawing Sheets

(51) Int. Cl.
*G02B 5/22* (2006.01)
*G01J 3/36* (2006.01)
*G01J 3/02* (2006.01)
*G02B 5/02* (2006.01)
*G01J 3/12* (2006.01)

(52) U.S. Cl.
CPC ........... *G02B 5/0278* (2013.01); *G02B 5/226* (2013.01); *G02B 7/006* (2013.01); *G01J 2003/1213* (2013.01)

(58) Field of Classification Search
CPC ....... G01J 2003/2813; G01J 2003/2816; G01J 2003/2826; G03F 7/0015; G03F 7/0382; G03F 7/0392; G03F 7/70308
USPC ........... 359/350, 359, 589, 885, 891; 438/70
See application file for complete search history.

(56) References Cited

U.S. PATENT DOCUMENTS

| | | | | |
|---|---|---|---|---|
| 5,395,678 A * | 3/1995 | Matsushima | ..... | G02F 1/133516 428/209 |
| 5,648,874 A * | 7/1997 | Sawaki | ........ | G02B 3/0012 359/619 |
| 5,768,023 A * | 6/1998 | Sawaki | ........ | H04N 1/0315 359/622 |
| 5,916,714 A * | 6/1999 | Sato | ........ | G02B 5/201 430/7 |
| 6,068,953 A * | 5/2000 | Matsumoto | ....... | G02F 1/133516 430/7 |
| 7,294,439 B2 * | 11/2007 | Kawaguchi | ........ | G02B 5/201 430/7 |
| 8,350,054 B2 * | 1/2013 | Mae | ........ | G02B 5/201 548/437 |
| 9,337,096 B2 | 5/2016 | Wang et al. | | |
| 9,448,114 B2 | 9/2016 | Goldring et al. | | |
| 10,012,796 B2 * | 7/2018 | Xiao | ........ | G02B 6/29398 |
| 2004/0051781 A1 * | 3/2004 | Kawaguchi | ........ | G02B 5/201 348/34 |
| 2007/0116423 A1 | 5/2007 | Leatherdale et al. | | |
| 2007/0154819 A1 * | 7/2007 | Chen | ........ | G02B 5/223 430/7 |
| 2010/0007975 A1 * | 1/2010 | Tsao | ........ | G02B 5/201 359/891 |
| 2014/0085597 A1 * | 3/2014 | Katou | ........ | B29C 33/3857 349/194 |
| 2014/0154868 A1 * | 6/2014 | Sugo | ........ | H01L 21/6835 438/458 |
| 2016/0181141 A1 | 6/2016 | Nakamura | | |
| 2016/0276306 A1 | 9/2016 | Kamphuis et al. | | |
| 2017/0005144 A1 * | 1/2017 | Akagawa | ........ | G02B 27/0172 |
| 2017/0184789 A1 * | 6/2017 | Xiao | ........ | G02B 6/29365 |
| 2017/0351041 A1 * | 12/2017 | Mathai | ........ | G02B 6/4206 |
| 2018/0224332 A1 * | 8/2018 | Ooi | ........ | G01J 3/26 |

* cited by examiner

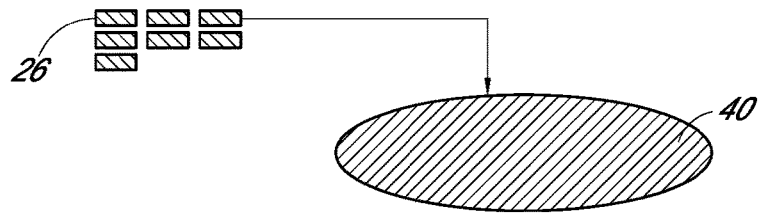
FIG. 4A
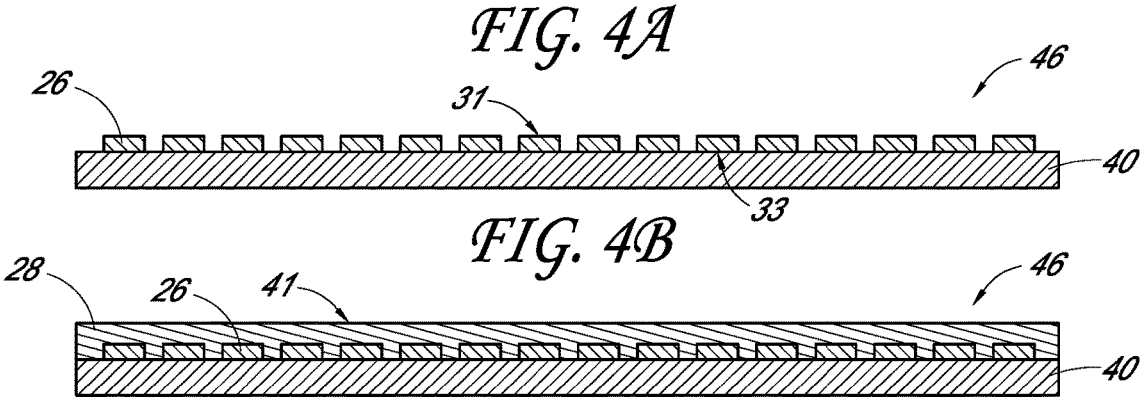
FIG. 4B
FIG. 4C
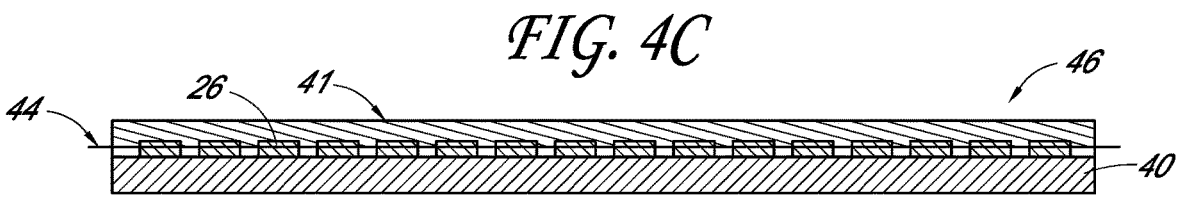
FIG. 4D
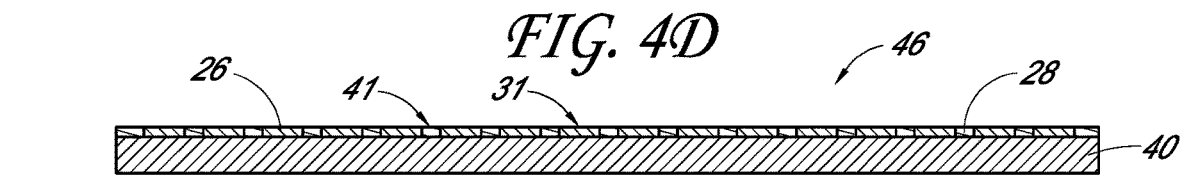
FIG. 4E
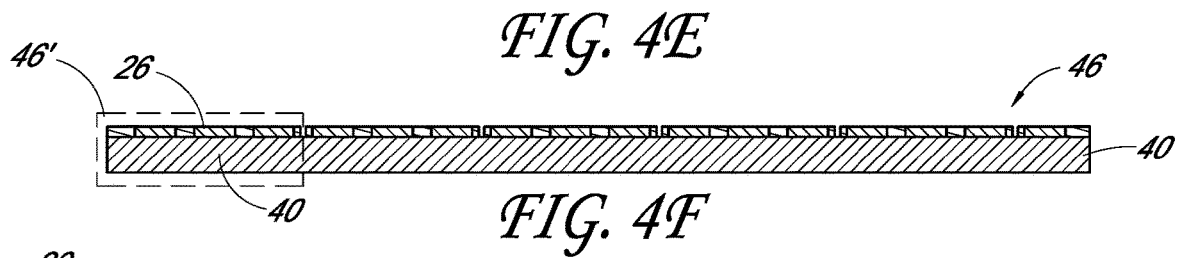
FIG. 4F
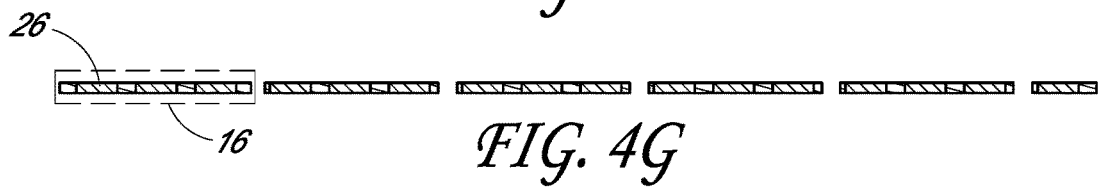
FIG. 4G

THIN OPTICAL FILTER ARRAYS

CROSS-REFERENCE TO RELATED APPLICATIONS

This application claims the benefit of U.S. Provisional Application No. 62/438,363 entitled "THIN OPTICAL FILTER ARRAYS," filed Dec. 22, 2016, the entire disclosure of which is incorporated herein by reference for all purposes.

BACKGROUND

Field

The field relates to optical filters, and, in particular to arrays of optical filters sized to be disposed in small form factor systems, such as a handheld spectrometer.

Description of the Related Art

Optical filters are produced by applying optical filter layers on optically transparent substrates. The substrates of optical filters are preferably thin for performance and/or operational reasons. However, in many conventional optical systems, the processes used to create filters may be expensive, and extremely thin filters are difficult to handle, leading to filters that may occupy excessive space in small optoelectronic systems and/or exhibit low intensity transmission.

Accordingly, there remains a continuing need for improved filters for various types of optical systems.

SUMMARY

In one aspect, an array of optical filters having a front side and a back side is disclosed. The array of optical filters includes first and second optical filters, and a molding compound. The first optical filter has a back surface coincident with the back side of the array and a first filter layer having a front surface coincident with the front side of the array. The first optical filter also has a first sidewall extending from the front side to the back side, and the first optical filter is configured to pass a first range of optical wavelengths. The second optical filter includes a second substrate having a back surface coincident with the back side of the array and a second filter layer having a front surface coincident with the front side of the array. The second optical filter includes a second sidewall extending from the front side to the back side, and the second optical filter is configured to pass a second range of optical wavelengths different from the first range. The molding compound is disposed between the first and second sidewalls. The molding compound is coplanar with the front surfaces of the first and second optical filter layers and is coplanar with the back surfaces of the first and second substrates.

In another aspect, an optical filter is disclosed. The optical filter includes an optically transparent substrate that has a front side and a back side, an optical filter layer on the front side of the optically transparent substrate, and a molding compound. The molding compound is disposed on a sidewall of the optically transparent substrate and the optical filter layers. The molding compound is coplanar with the back side of the optically transparent substrate and the front side of the optical filter layers. The molding compound has a thickness from the front side of the optical filter layer to the back side of the optically transparent substrate in a range of 50 µm to 500 µm.

In another aspect, a method of making an array of optical filters is disclosed. The method includes placing front sides of a plurality of optical filters on a reconstitution substrate, applying a molding compound, thinning portions of the molding compound and the optical filters from a back side opposite the front side, and removing the reconstitution substrate from the optical filters and the molding compound. In embodiments, the optical filters are spaced apart by a plurality of gaps and the molding compound is applied within the gaps.

Details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

Embodiments will now be described with reference to the following drawings, which are provided by way of example, and not limitation.

FIG. 4A is a schematic perspective view of a substrate populated with arrays of filters in a stage of a method of making a filter array according to various embodiments.

FIG. 4B is a schematic cross section showing the substrate of FIG. 4A.

FIG. 4C is a schematic cross section showing the substrate of FIG. 4B after dispensing an encapsulant.

FIG. 4D is a schematic cross section showing the substrate of FIG. 4C with a line to indicate a target surface for a thinning process.

FIG. 4E is a schematic cross section showing the substrate of FIG. 4D after the thinning process.

FIG. 4F is a schematic cross section showing the substrate of FIG. 4E after a dicing process to form multiple arrays of the filters embedded in the encapsulant.

FIG. 4G is a schematic cross section showing the substrate of FIG. 4F after removal of the substrate from the arrays.

DETAILED DESCRIPTION

Various embodiments disclosed herein relate to filter arrays to be used in systems that have relatively small thickness. The embodiments disclosed herein may be particularly beneficial for portable, and particularly handheld optical systems. The embodiments disclosed herein may also be particularly beneficial for optical systems used in a limited height or thickness, such as smart phones, camera phones, digital cameras, personal digital assistants or handheld optical sensors, such as portable spectrometers.

When a thick filter array is used in a system, the filter array may cause negative effects. For example, the thick filter array may increase the size and/or the weight of the overall system. One example of such a system is a spectrometer system. A user may use a spectrometer to inspect a variety of objects or surfaces, and data obtained from the inspection may be analyzed to determine, for example, molecular or atomic make-up of the object or surface. For example, if a handheld spectrometer is used by an apple farmer, the farmer may inspect apples to know the ripeness of the apples for picking them at a right timing, from the obtained data. In another example, the spectrometer may be used to inspect trash to know chemical contents of the trash for determining whether to throw the trash as a regular waste or recycle waste. In these situations, a small light-weight spectrometer can improve portability.

Another disadvantage for a thick filter array in a system is degradation of a filtering quality. A thick filter may mean that a detected light travels through the filter for a longer distance. This may cause optical noise and signal overlap which may be undesirable for accuracy of measurements. Thus a thinner filter can provide for more precise and/or accurate measurements.

In some arrangements, filters may be produced in large wafers. Typical wafer-level processes produce filters with thick substrates, as wafers are provided with a standard thickness for handling during manufacture.

In some embodiments, the optical filters disclosed herein may be thinned by a thinning technique such as back-grinding technique, after wafer-level processing using standard thickness substrates during optical coating. Post-processing thinning processes are limited by the need for minimal thicknesses during singulation and handling.

Figure 1:
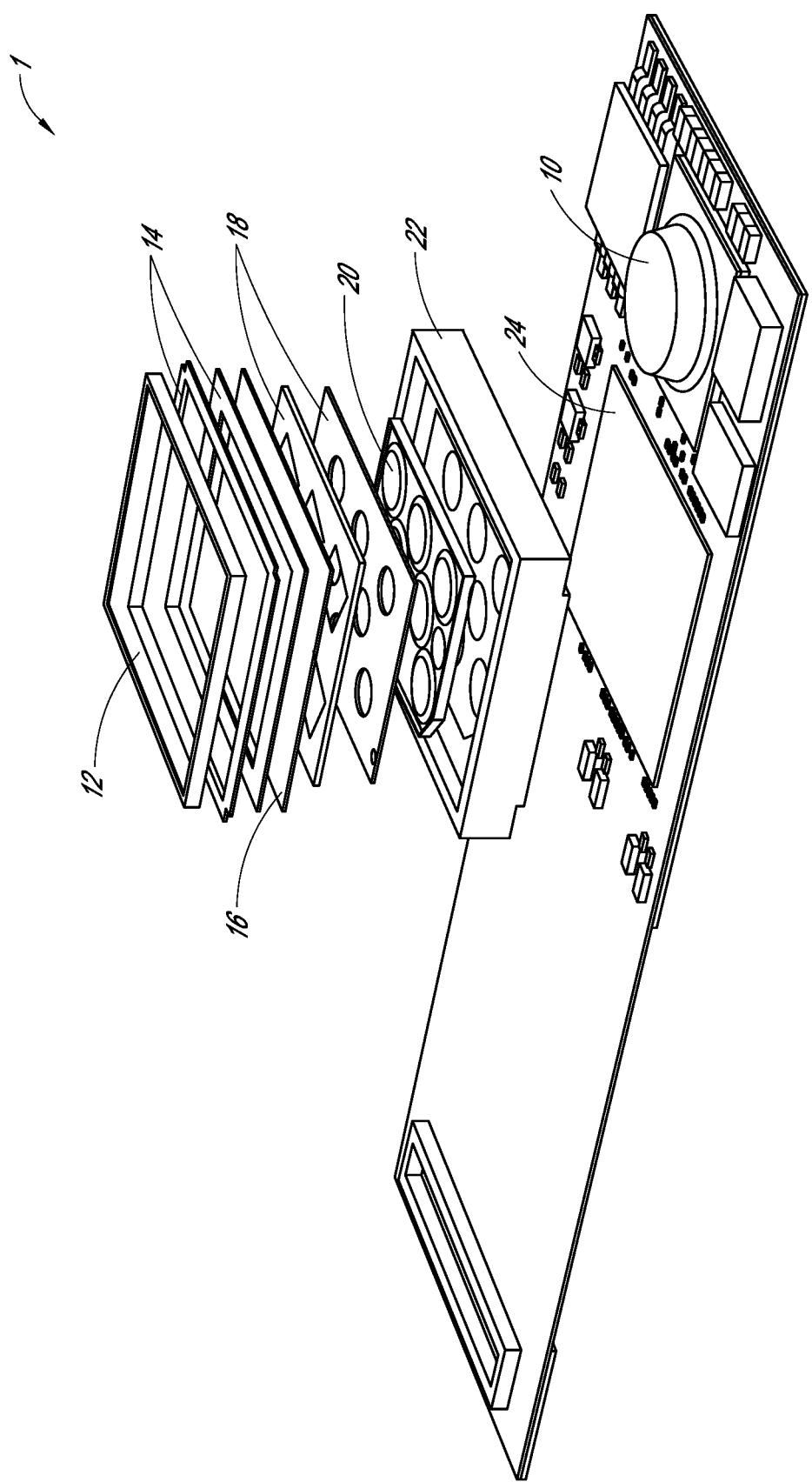
FIG. 1 is a perspective exploded view of an optical device, according to various embodiments.

FIG. 1 is a perspective exploded view of an optical device 1. In FIG. 1, the optical device 1 comprises a spectrometer device, but it should be appreciated that various embodiments disclosed herein can be utilized with other types of optical devices. The optical device 1 can be configured to filter and detect light at multiple different predefined ranges of wavelengths. As shown in FIG. 1, the optical device 1 can include a stack of optical components disposed in a small footprint, e.g., to enable device functionality that is also sized for portability, that is, to be carried by a user. The optical device 1 can comprise a front window 12, one or more diffusers 14, a filter array 16, first apertures 18, a lens assembly 20, second apertures 22, and a sensor 24. In some embodiments, the optical device 1 can comprise a light emitter 10 that actively illuminates a target object, which reflects the light back to the front window 12. In other embodiments, however, the optical device 1 may not include a light emitter, or may otherwise passively receive ambient light that is reflected or transmitted from the target object.

During use, in active illumination embodiments, the light emitter 10 emits light directed at the target object, and the emitted light can be reflected back to the optical device 1. In passive illumination arrangements, ambient or other light may be reflected by, transmitted through, or otherwise transferred from the target object to the optical device 1. The light from the object of interest can pass through the front window 12, the one or more diffusers 14, the filter array 16, the first apertures 18, the lens assembly 20, and the second apertures 22 to impinge upon the sensor 24.

The front window 12 can comprise a material transmissive to radiation at wavelengths at which the sensor 24 is responsive, e.g., to infrared radiation, visible radiation, etc. In some embodiments, the front window 12 can comprise a glass window. In other embodiments, the front window 12 can comprise other suitable materials. The front window 12 can act in some embodiments as a broadband transmissive filter for the device 1. The one or more diffusers 14 can comprise optical structures configured to spread or diffuse incoming radiation. For example, in some embodiments, it may be desirable to broaden the incoming radiation prior to passing the radiation through the rear imaging optics. The optical filter array 16 can comprise an array of laterally spaced filters 26 (see FIG. 2). In the device 1 shown in FIG. 2, the filter array 16 has eight filters 26. The filters 26 can be selected to pass different wavelengths such that the filter array 16 filters the reflected light into eight different spectrums of light. Thus, each of the filters 26 in the filter array 16 can be differently configured. The different spectrums are then detected by different segments of the sensor. Although the illustrated filter array 16 includes eight filters, any suitable number of filters may be used. In some embodiments, two or more of the filters of the filter array 16 may pass the same wavelength of light.

Referring again to FIG. 1, the filtered light can pass through the array of first apertures 18 and through corresponding lenses of the lens assembly 20. The first apertures 18 can be sized and shaped so as to limit the amount of light entering the lens assembly 20 at the edges of the image. In some arrangements, the first apertures 18 can be configured to reduce optical crosstalk. The lens assembly 20 can comprise any suitable number and type of lenses. In some embodiments, the lens assembly 20 may comprise one lens for each filter 26 (FIG. 2) in the filter array 16. In other embodiments, the lens assembly 20 may include more or fewer lenses than the number of filters. Light can then pass through the second apertures 22, which may further reduce crosstalk or otherwise shape the image, and impinge upon the sensor 24. The sensor 24 can comprise an array of light-sensitive elements (e.g., pixels) that are configured to transduce incoming radiation into electrical signals. The device 1 can comprise electronic circuitry configured to process the electrical signals to characterize the target object and can communicate the processed signals to and/or from external devices. The electronic circuitry is arranged to separately treat the collections of pixels receiving light through the different filters 26 (FIG. 2).

Figure 2:
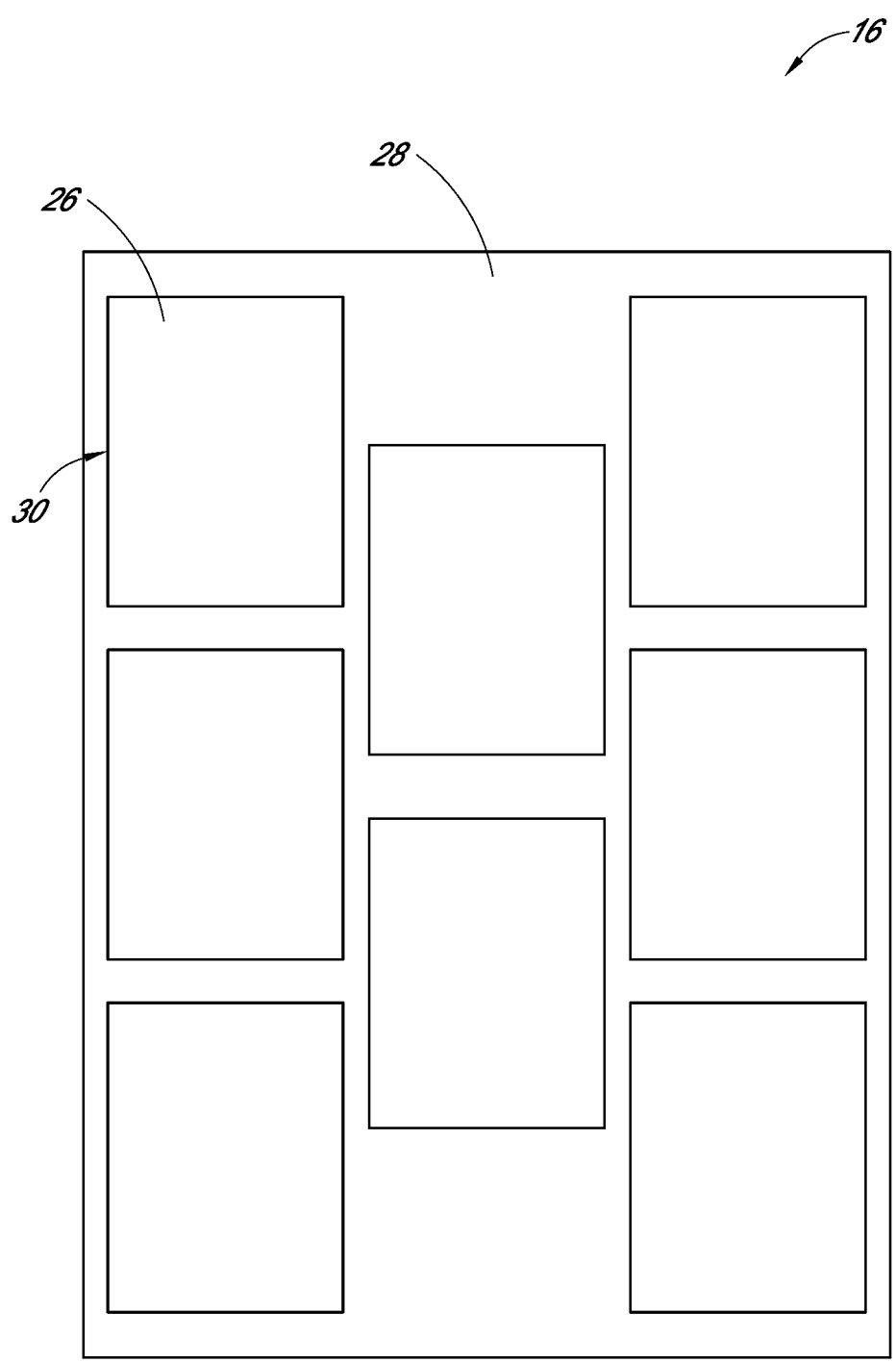
FIG. 2 is a top plan view of a filter array that can be used in conjunction with the optical device of FIG. 1.

FIG. 2 is a top plan view of a filter array 16 showing a top surface of the filter array 16. The filter array 16 may include a plurality of filters 26 and a molding compound 28. The filters 26 have sidewalls 30. The molding compound 28 is disposed neighboring the sidewalls 30.

There are eight filters 26 shown in FIG. 2. However, the filter array 16 may have any number of filters 26 suitable for the use. In some embodiments, a filter array 16 may have n numbers of different filters 26 for passing wavelengths ranging from $10^{-3}$ meters (e.g., ultraviolet rays) to $10^{-4}$ meters (e.g., infrared rays), 400 nanometers (e.g., low visible) to $10^{-4}$ meters (e.g., infrared rays), $10^{-12}$ meters (e.g., X-rays) to 800 nanometers (e.g., high visible) or any other ranges suitable for particular purposes. Further, the size of gaps between the filters 26 may vary depends on particular arrangements of the filters 26. The shape of the filters 26 may have a polygonal (e.g., rectangular) shape as shown in FIG. 2, but in other embodiments, the filter array 16 may have differently shaped filters, for example a rounded (e.g., circular) shape. The top surface of the filer 26 may size, for example, in the range of 0.25 mm$^2$ to 5 mm$^2$, in the range of 0.25 mm$^2$ to 3 mm$^2$, in the range of 0.25 mm$^2$ to 1 mm$^2$, or in the range of 0.25 mm$^2$ to 0.75 mm$^2$. The top surface of the filter array 16 illustrated in FIG. 2 may size, for example, in the range of 2 mm$^2$ to 40 mm$^2$, in the range of 2 mm$^2$ to 20 mm$^2$, in the range of 2 mm$^2$ to 10 mm$^2$, or in the range of 5 mm$^2$ to 10 mm$^2$.

Figure 3:
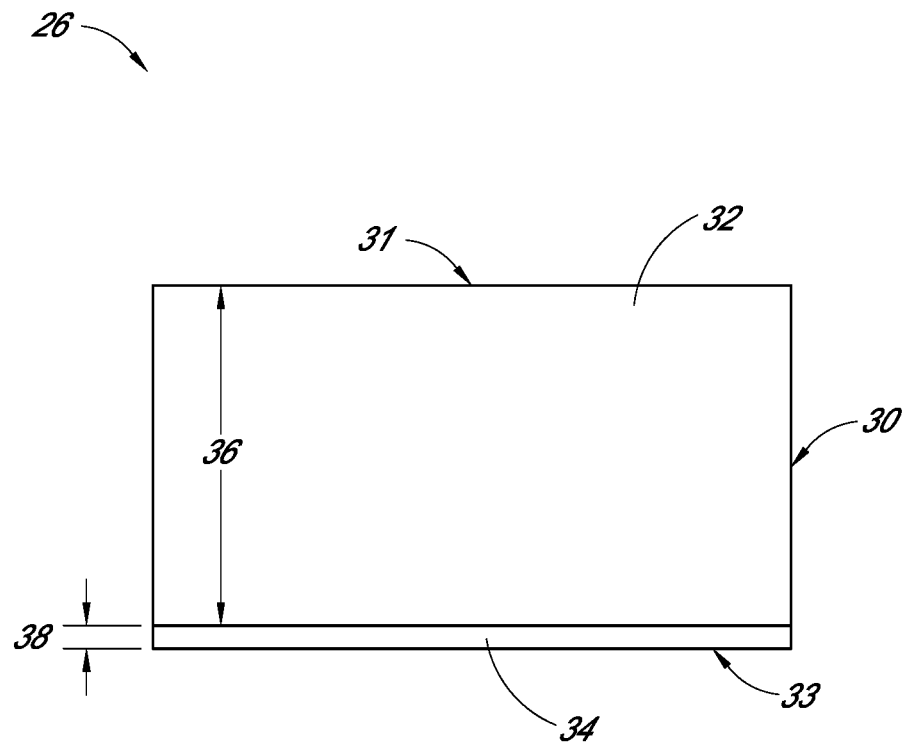
FIG. 3 a side elevational view of a filter that can be used in the filter array of FIG. 2.

FIG. 3 is a side view of a filter 26 that can be used in conjunction with the filter array 16 of FIG. 1. The filter 26 may include an optically transparent substrate 32 (e.g., glasses, plastics, semiconductor materials, etc.) and a filter layer 34. The filter 26 has a back side 31, a front side 33 and sidewalls 30. The optically transparent substrate 32 has a substrate thickness 36 and the filter layer 34 has a layer thickness 38.

The filter 26 may comprise a filter layer 34 to have desired filtering properties. The filter layer 34 can comprise a plurality of optical quality thin films arranged to filter a particular wavelength. It will be understood that each filter 26 of the array 16 (see FIG. 2) can have a different filter layer 34 construction in accordance with the range of wavelengths it is designed to pass. Each filter 26 may have different combinations of the plurality of optical quality thin films to achieve this. In some embodiments, using more optical quality thin films can narrow the range of wavelengths. The filter 26 can be formed by depositing the films for the filter layer 34 on a transparent substrate, thinning the substrate, and then singulating individual filters 26 from the substrate. In order to withstand the singulation process and subsequent handling, the thinned substrate remains relatively thick. In some embodiments, the substrate thickness 36 of the singulated filter 34 may be greater than 0.5 mm, for example, in a range of 0.5 mm to 1.5 mm, in a range of 0.5 mm to 1 mm, in a range of 0.7 mm to 1.5 mm, or in a range of 0.7 mm to 1 mm. The layer thickness 38 of the filter layer 34, including multiple optical quality thin films, may be less than 50 µm, for example, in a range of 5 µm to 100 µm, in a range of 10 µm to 50 µm, or in a range of 10 µm to 30 µm, e.g., about 20 µm in some embodiments. The relatively thick substrate 32 may be undesirable in various arrangements because the increased thickness may cause optical noise and/or otherwise may degrade optical signal integrity, in addition to occupying excessive vertical space in an opto-electronic device incorporating the filter, such as the hand-held spectrometer illustrated in FIG. 1.

FIGS. 4A to 4G show various stages of a method of making the filter arrays 16. FIG. 4A is a schematic top perspective view of a substrate and a plurality of filters 26 to be placed on the substrate. The substrate can comprise any suitable carrier for temporarily supporting the filters 26 during manufacturing, and in the illustrated embodiment comprises a film frame 40. Accordingly, the substrate can also be referred to as a sacrificial substrate, or a reconstitution substrate.

FIGS. 4B-4G are schematic side cross-sectional views of the filters 26 and film frame 40 at the various stages of the method. In FIGS. 4B-4F, the filters 26, film frame 40, and other components can define part of a partially reconstituted substrate 46 comprising multiple arrays of filters, each comprising multiple different filters 26 for passing different ranges of light. Referring to FIGS. 4A and 4B, filters 26 can be picked and placed on the film frame 40. The film frame 40 can comprise a frame structure with a film suspended between or across the frame structure. In some embodiments, the film of the film frame 40 can comprise an adhesive, such as tape. The filters 26 can be placed on the film frame 40 such that the front side 33 of the filters 26 faces down on the film frame 40. Thus, as shown in FIG. 4B, the back side 31 of the optically transparent substrate 32 of the filters 26 can be exposed, and the filter layer 34 can contact the film frame 40. The filter layer 34 can be adhered to the frame 40 by way of an adhesive so as to maintain the filters 26 at desired lateral spacings relative to one another. In some embodiments, a high precision pick-and-place machine can be configured to place the filters 26 on the frame 40 at precise spacings corresponding to the final filter array 16.

After the filters 26 are place on the film frame 40, a molding compound 28 can be applied to cover the filters 26, thereby creating a sheet of molding compound with filters 26 embedded in the molding compound 28 as shown in FIG. 4C. For example, as shown in FIG. 4C, portions of the molding compound 28 can be disposed laterally between adjacent filters 26 and over the back sides 31 of the filters 26. The molding compound 28 can comprise any suitable type of filler material, such as a thermosetting polymer. Because the filter layers 34 are facing the film frame 40, the film frame 40 can protect the sensitive filter layers 34 from the molding compound 28 during manufacture.

Moving to FIGS. 4D and 4E, as explained above, it can be desirable to thin from a back side 41 of the molding compound 28 to reduce the overall thickness of the filter array 16. As explained above, it can be desirable to provide thin filter arrays dimensioned for use in small form-factor devices, such as the optical device 1 (e.g., a handheld spectrometer). The manufacturer can select any suitable thickness for the resulting filter arrays 16, represented by the schematic thinning line 44 in FIG. 4D defined based on a desired thickness of the filters 26. As shown in FIG. 4E, the back side 41 of the molding compound 28 and the back sides 31 of the optically transparent substrate 32 of the filters 26 can be thinned to the thinning line 44.

Figure 4H:
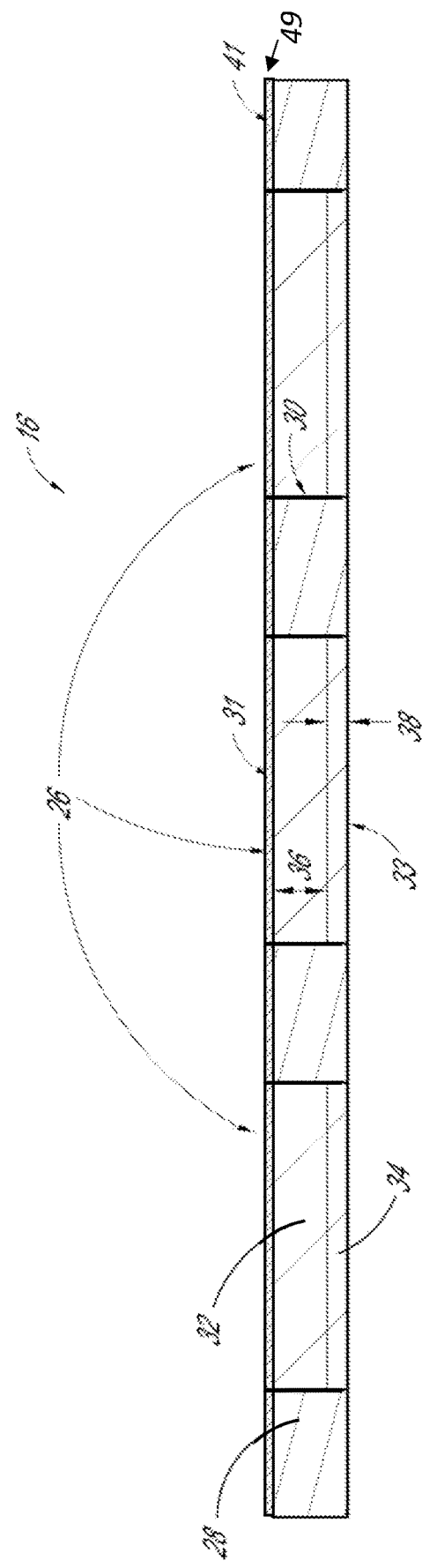
FIG. 4H is an enlarged schematic cross section of one of the arrays of FIG. 4G.

Any suitable thinning process (i.e., material removal procedure) can be used to thin the molding compound 28 and the filters 26. For example, in some embodiments, a grinding machine can mechanically abrade the back sides of the molding compound 28 and the substrates 32. In still other embodiments, chemical mechanical polishing (CMP) or lapping may be used, or any other suitable thinning processes can be utilized. The thinned backsides of the molding compound 28 and the substrates 32 of the filters 26 can be coplanar and comprise markings (see FIG. 4H) having a signature representative of the thinning process. For example, the backsides of both the molding compound 26 and the substrates 32 of each filter 26 may comprise scores, scratches, or patterns representative of the movement and stresses applied by the grinding processes. After the thinning process, thinned backsides 41, 31 of the molding compound 28 and the optically transparent substrates 32, respectively, are exposed, as shown in FIG. 4E, such that the molding compound 28 is provided between adjacent filters 26 (but not over the back sides 31 of the filters 26). The thinning can therefore remove the entire portion of the molding compound 28 that is disposed above the back sides 31 of the substrates 32, and can further remove only portions of the substrate 32 and portions of the molding compound 28 disposed between the filters 26.

Turning to FIG. 4F, the partially reconstituted filter array 46 of FIG. 4E can be singulated to define a plurality of reconstituted pieces 46'. For example, the partially reconstituted filter array 46 of FIG. 4E can be diced by sawing along saw streets defined between adjacent filter arrays to separate the reconstituted pieces 46' from one another. For another example, the partially reconstituted filter array 46 of FIG. 4E can be diced by water jet cutting. For another example, the partially reconstituted filter array 46 of FIG. 4E can be diced by laser cutting. In FIG. 4G, the film frame 40 of the reconstituted pieces 46' can be removed to define a plurality of the filter arrays 16.

The filters 26 may be arranged in many variant ways on the film frame 40. The film frame 40 may have an adhesive property to better hold the filters 26 in place. The filters 26 may have varying thicknesses, such that, during the thinning process, the thickest one starts to be thinned before thinner filters. The thinning may be accomplished by grinding, lapping, etc. The film frame 40 may be separated from the filters 26 and molding compound 28 between the thinning process and the singulation process in some embodiments.

Beneficially, the thinned filter arrays 16 shown in FIG. 4G can have a total thickness in a range of 50 to 500 microns, in a range of 50 to 300 microns, in a range of 100 to 300 microns, or in a range of 150 microns to 250 microns, e.g., about 200 microns in some embodiments. The thinned optical filters 26 of the filter array 16 can provide improved optical performance and reduce manufacturing costs. For example, thinning multiple filter arrays 16 on the substrate (e.g., film frame 40) while simultaneously fixing the filters 26 relative to one another in the array 16 can enable higher throughput. Moreover, thinning the filters embedded within the molding compound 28 and singulating arrays 16 thereafter can reduce the negative effects of chip-out that can be created in other processes.

An enlarged view of the thinned filter array 16 is shown in FIG. 4H. The molding compound 28 fills the gaps between and covers the filter sidewalls 30, but does not cover the back sides 31 or the front sides 33 of the filters 26. The molding compound 28 is coplanar with the front side 33 of the filter layer 34. Also, the back side 41 of the molding compound 28 is coplanar with the back side 31 of the optically transparent substrate 32. The back sides 41, 31 may also have markings 49 characteristic of the thinning process (e.g., back-grinding). Three filters 26 are shown in FIG. 4H. At least two of the filters 26 have different filter layers 34. In particular, the filter layers 34 can have different compositions, include different combinations of optical thin films, and/or have different overall layer thicknesses 38. In the illustrated embodiment, each of the different filters 26 in the array 16 has a different construction for its filter layer 34, such that each filter 26 passes a different range of wavelengths.

Figure 5:
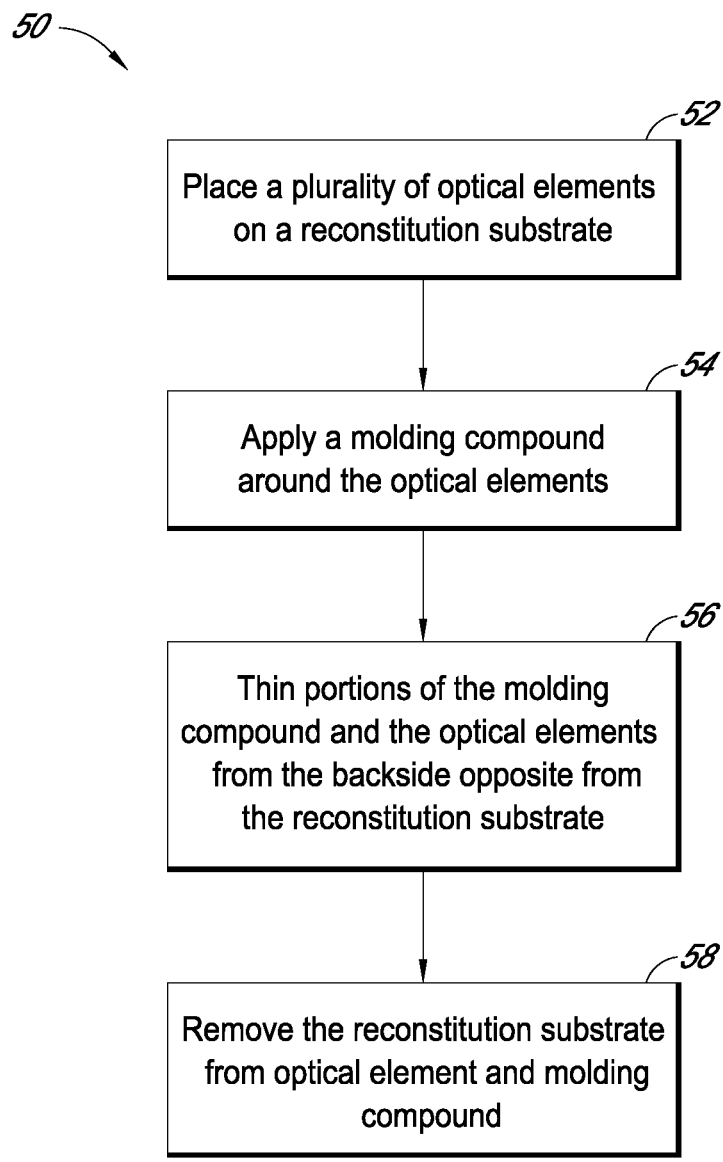
FIG. 5 is a flowchart depicting a method of making an array of optical elements, according to various embodiments.

FIG. 5 is a flowchart depicting steps of a method 50 of making an array of filters 16. The method 50 begins in a block 52, in which a plurality of optical element is placed on a reconstitution substrate. As explained above, the can comprise a filters, which in turn each comprise a substrate and an optical filter layer on the substrate. The filter can be pick-and-placed using a highly accurate machine such that the filter layer faces the reconstitution substrate. The reconstitution substrate can comprise a film frame including a frame upon which a tape or other film is disposed. In a block 54, a molding compound is applied over and around the optical elements. For example, the molding compound can be applied in gaps between adjacent filters as well as over the backsides of the filters. The molding compound can be any suitable material, such as an epoxy or a thermosetting polymer. Moving to a block 56, the molding compound and the optical elements embedded in the molding compound can be thinned from the back side which is the opposite side from the reconstitution substrate. Any suitable type of thinning process can be used. For example, the filters and molding compound can be back-grinded, polished, lapped, etc. Turning to a block 58, the reconstitution substrate can be removed from the optical elements and the molding compound. Prior to or after such removal, the arrays of optical elements can be singulated. In various arrangements, filter arrays can be diced from the reconstituted substrate prior to removal of the reconstitution substrate.

In some embodiments, the thinning process of the method may be a grinding process, lapping process, etc. In some embodiments, the substrate thickness 36 of the filters 26 before the thinning process may be between 500 µm to 1500 µm, or 500 µm to 1000 µm and the substrate thickness after the thinning process may be between 50 µm to 500 µm or 50 µm to 300 µm.

Although disclosed in the context of certain embodiments and examples, it will be understood by those skilled in the art that the present invention extends beyond the specifically disclosed embodiments to other alternative embodiments and/or uses and obvious modifications and equivalents thereof. In addition, while several variations have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the present disclosure. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the aspects that follow.

What is claimed is:

1. An array of optical filters having a front side and a back side comprising:
    a first optical filter comprising a first substrate having a back surface coincident with the back side of the array and a first filter layer having a front surface coincident with the front side of the array, the first optical filter having a first sidewall extending from the front side to the back side, the first optical filter configured to pass a first range of optical wavelengths;
    a second optical filter comprising a second substrate having a back surface coincident with the back side of the array and a second filter layer having a front surface coincident with the front side of the array, the second optical filter having a second sidewall extending from the front side to the back side, the second optical filter configured to pass a second range of optical wavelengths different from the first range; and
    a molding compound between the first sidewall of the first optical filter and the second sidewall of the second optical filter, the molding compound being coplanar with the front surfaces of the first and second optical filter layers and being coplanar with the back surfaces of the first and second substrates,
    wherein the back surfaces of the first and second substrates and a back side of the molding compound comprise markings that define a signature of a material removal procedure, the markings comprising scores or scratches.

2. The array of optical filters of claim 1, wherein the first substrate comprises glass.

3. The array of optical filters of claim 1, wherein the second substrate comprises glass.

4. The array of optical filters of claim 1, wherein the scores or scratches define a signature of a grinding procedure.

5. The array of optical filters of claim 1, wherein the molding compound has a thickness from the front side of the array of optical filters to the back side of the array of optical filters in a range of 50 µm to 500 µm.

6. The array of optical filters of claim 1, wherein the front side of the first filter layer is exposed.

7. The array of optical filters of claim 1, wherein the first filter layer has a first thickness and the second filter layer has a second thickness different from the first thickness.

8. An optical filter comprising:
   an optically transparent substrate having a front side and a back side;
   an optical filter layer on the front side of the optically transparent substrate; and
   a molding compound deposited on a sidewall of the optically transparent substrate and a sidewall of the optical filter layer, the molding compound comprising a different material from a material of the optically transparent substrate, the molding compound being coplanar with the back side of the optically transparent substrate and a front side of the optical filter layer,
   wherein the back side of the optically transparent substrate and a back side of the molding compound comprise markings that define a signature of a material removal procedure, the markings comprises scores or scratches.

9. The optical filter of claim 8 wherein the optically transparent substrate comprises glass.

10. The optical filter of claim 8, wherein a thickness of the optical filter layer is in a range of 5 μm to 100 μm.

11. The optical filter of claim 8, wherein the front side of the optical filter layer and the backside of the optically transparent substrate are exposed, and wherein the molding compound completely surrounds the sidewall of the optical filter layer and the optically transparent substrate.

12. An array of optical filters, the array comprising the optical filter of claim 8, the array further comprising a second optical filter having a second optically transparent substrate and a second optical filter layer, the second optical filter laterally spaced from the optical filter with the molding compound intervening between the optical filter and the second optical filter.

13. The array of claim 12, wherein a back side of the second optically transparent substrate being coplanar with the back side of the optically transparent substrate.

14. A method of making an array of optical filters, the method comprising:
   placing front sides of a plurality of optical elements on a reconstitution substrate such that the optical elements are spaced apart by a plurality of gaps, the plurality of optical elements comprising a first optical filter and a second optical filter, front surfaces of the first and second optical filters coincident with the front sides of the plurality of optical elements;
   applying a molding compound around the optical elements within the gaps such that the molding compound is disposed at least between a first sidewall of the first optical filter and a second sidewall of the second optical filter, the molding compound being coplanar with the front surfaces of the first and second optical filter layers;
   thinning portions of the molding compound and the optical elements from back sides of the optical elements, the back sides opposite the front sides such that the molding compound is coplanar with back surfaces opposite the from surfaces of the first and second substrates; and
   removing the reconstitution substrate from the optical elements and the molding compound such that the back surface of the first and second substrates and a back side of the molding compound comprise markings that define a signature of a material removal procedure, the markings comprising scores or scratches.

15. The method of claim 14, wherein the optical elements comprise a plurality of different optical filters having different filter layers for passing different ranges of light.

16. The method of claim 14, wherein the reconstitution substrate comprises a film frame with an adhesive film, wherein said placing comprises adhering the optical elements to the film frame.

17. The method of claim 14, further comprising applying the mold compound over back sides of the optical elements.

18. The method of claim 14, further comprising dicing the optical elements into a plurality of diced optical element arrays after said thinning and prior to said removing.

19. The method of claim 14, wherein said thinning comprises reducing a thickness of the portions of the molding compound and the optical elements to a range of 50 μm to 500 μm.

20. The method of claim 14, wherein said thinning comprises grinding.

* * * * *